May 7, 1968
N. W. KALENDA
3,382,075
SUPERSENSITIZATION OF BENZYLIDENE DYES IN
SILVER HALIDE EMULSIONS
Filed Dec. 8, 1964
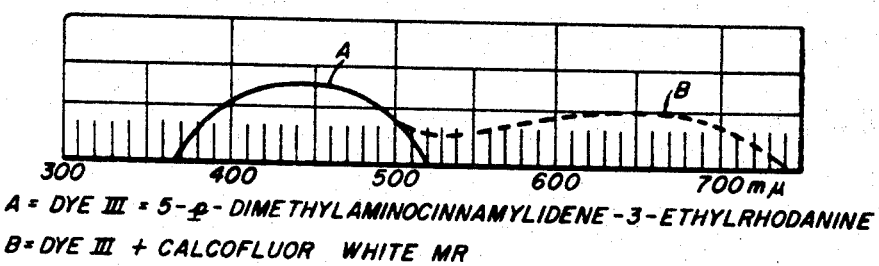
A = DYE III = 5-*p*-DIMETHYLAMINOCINNAMYLIDENE-3-ETHYLRHODANINE
B = DYE III + CALCOFLUOR WHITE MR
NORMAN W. KALENDA
INVENTOR.
BY R. Frank Smith
Ray Carter Livermore
ATTORNEY & AGENT

United States Patent Office 3,382,075
Patented May 7, 1968

3,382,075
SUPERSENSITIZATION OF BENZYLIDENE DYES IN SILVER HALIDE EMULSIONS
Norman W. Kalenda, Rochester, N.Y., assignor to Eastman Kodak Company, Rochester, N.Y., a corporation of New Jersey
Filed Dec. 8, 1964, Ser. No. 416,753
14 Claims. (Cl. 96—104)

ABSTRACT OF THE DISCLOSURE

Photographic silver halide emulsions sensitized by benzylidene dyes are advantageously supersensitized by adding at least one sulfonic acid derivative of a bis(triazinylamino)stilbene, a dibenzothiophene dioxide, a biphenyl, a terphenyl, a quaterphenyl, a phenanthrene, a pyrene, or a chrysene.

---

This invention relates to photographic silver halide emulsions containing benzylidene dyes, and in supersensitizing combination therewith, certain sulfonated compounds.

It is known in the art of making photographic emulsions that certain dyes of the cyanine class alter the sensitivity of photographic emulsions of the gelatino-silverhalide kind, when the dyes are incorporated in the emulsions. It is also known that the sensitization produced by a given dye varies somewhat with the type of emulsion in which the dye is incorporated. Furthermore, the sensitization of a given emulsion by a given dye may be altered by varying the conditions in the emulsion. For example, the sensitization may be increased by increasing the silver ion concentration or decreasing the hydrogen ion concentration (i.e., increasing the alkalinity), or both. Thus, sensitization can be increased by bathing plates coated with a spectrally sensitized emulsion, in water or in aqueous solutions of ammonia. Such a process of altering the sensitivity of a sensitized emulsion by increasing the silver ion concentration and/or by decreasing the hydrogen ion concentration is commonly called "hypersensitization." Hypersensitized emulsions have generally poor keeping qualities. Various combinations of two or more sensitizing dyes have also been proposed to alter the sensitivity of such emulsions.

I have now found that photographic silver halide emulsions containing benzylidene dyes are markedly increased in sensitivity by incorporating therewith certain sulfonated compounds. This method is designated herein as supersensitization and the combinations of dyes as supersensitizing combinations.

It is, therefore, an object of my invention to provide photographic silver halide emulsions containing benzylidene dyes and, in supersensitizing combination therewith, certain sulfonated compounds. Another object is to provide methods for making these emulsions. Other objects will become apparent from a consideration of the following description and examples.

The benzylidene dyes useful in practicing my invention include those dyes represented by the following general formulas:

(I) 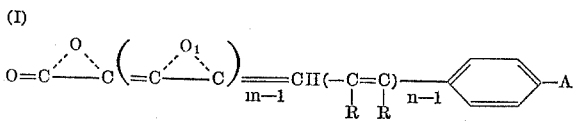

and (II) 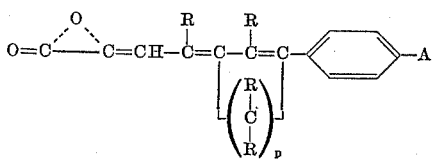

wherein $m$ represents an integer of from 1 to 2; $n$ represents an integer of from 1 to 3; $p$ represents an integer of from 2 to 3; each R represents the hydrogen atom or the same or different lower alkyl group (e.g., methyl, ethyl, propyl, isopropyl, butyl, etc.); A represents the hydroxyl radical, an alkoxy group (e.g., methoxy, ethoxy, butoxy, dodecyloxy, etc.) or the group $-NR_1R_2$ wherein $R_1$ and $R_2$ each represents the (same or different) group selected from the class consisting of the hydrogen atom and an alkyl group (e.g., methyl, sulfoethyl, carboyethyl, hydroxyethyl, methoxyethyl, phenethyl, carboxypropyl, butyl, sulfobutyl, hydroxybutyl, methoxybutyl, hexyl, ethoxyoctyl, sulfodecyl, carboxydecyl, dodecyl, etc.); Q represents the non-metallic atoms required to complete a 5 to 6 membered heterocyclic nucleus such as those of the 2-pyrazolin-5-one series (e.g., 3-methyl-1-phenyl-2-pyrazolone-5-one, 1-phenyl-2-pyrazolin-5-one, 1-(2-benzothiazolyl)-3-methyl-2-pyrazolin-5-one, etc.), those of the isoxazolone series (e.g., 3-phenyl-5(4H)-isoxazolone, 3-methyl-5-(4H)-isoxazolone, etc.), those of the oxindole series (e.g., 1-alkyl-2,3-dihydro-2-oxindoles, etc.) those of the 2,4,6-triketohexahydropyrimidine series (e.g., barbituric acid or 2-thiobarbituric acid as well as their 1-alkyl (e.g., 1-methyl, 1-ethyl, 1-propyl, 1-heptyl, etc.), or 1,3-dialkyl (e.g., 1,3-dimethyl, 1,3-diethyl, 1,3-dipropyl, 1,3-diisopropyl, 1,3 - dicyclohexyl, 1,3 - di($\beta$-methoxyethyl), etc.), or 1,3-diaryl (e.g., 1,3-diphenyl, 1,3-di-(p-chlorophenyl), 1,3-di(p-ethoxycarbonylphenyl), etc.), or 1-aryl (e.g., 1-phenyl, 1-p-chlorophenyl, 1-p-ethoxycarbonylphenyl), etc.) or 1-alkyl-3-aryl (e.g., 1-ethyl-3-phenyl, 1-heptyl-3-phenyl, etc.) (derivatives), those of the rhodanine series (i.e., 2-thio-2,4-thiazolidinedione series), such as rhodanine, 3-alkylrhodanines (e.g., 3-ethylrhodanine, 3-allylrhodanine, etc.), 3-carboxyalkylrhodanines (e.g., 3-(2 - carboxyethyl)rhodanine, 3 - (4-carboxybutyl)rhodanine, etc.), 3-sulfoalkylrhodanines (e.g., 3-(2-sulfoethyl) rhodanine, 3-(3-sulfopropyl)rhodanine, 3-(4-sulfobutyl) rhodanine, etc.), or 3-arylrhodanines (e.g., 3-phenylrhodanine, etc.), etc., those of the 2(3H)-imidazo-[1,2-a]-pyridone series, those of the 5,7-dioxo-6,7-dihydro-5-thiazolo-[3,2-a]pyrimidine series (e.g., 5,7-dioxo-3-phenyl-6,7-dihydro-5-thiozolo[3,2-a]pyrimidine, etc.), those of the 2-thio-2,4-oxazolidinedione series (i.e., those of the 2-thio-2,4(3H,5H)-oxazoledione series) (e.g., 3-ethyl-2-thio-2,4-oxazolidinedione, 3-(2-sulfoethyl)-2-thio-2,4-oxazolidinedione, 3-(4-sulfobutyl)-2-thio-2,4-oxazolidinedione, 3 - (3 - carboxypropyl)-2-thio-2,4-oxazolidinedione, etc.), those of the thianaphthenone series (e.g., 3-(2H)-thianaphthenone, etc.), those of the 2-thio-2,5-thiazolidinedione series (i.e., the 2-thio-2,5-(3H,4H)-thiazoledione series) (e.g., 3-ethyl-2-thio-2,5-thiazolidinedione, etc.), those of the 2,4-thiazolidinedione series (e.g., 2,4-thiazolidinedione, 3-ethyl-2,4-thiazolidinedione, 3-phenyl-2,4-thiazolidinedione, 3-α-naphthyl-2,4-thiazolidinedione, etc.), those of the thiazolidinone series (e.g., 4-thiazolidinone, 3-ethyl-4-thiazolidinone, 3-phenyl-4-thiazolidinone, 3-α-naphthyl-4-thiazolidinone, etc.), those of the 2-thiazolin-4-one series (e.g., 2-ethyl-mercapto-2-thiazolin-4-one, 2-alkylphenylamino-2-thiazolin-4-one, 2-diphenylamino-2-thiazolin-4-one, etc.), those of the 2 imino-4-oxazolidinone (i.e., pseudohydantoin) series, those of the 2,4-imidazolidinedions (hydantoin) series (e.g., 2,4-imidazolidinedione, 3-ethyl-2,4-imidazolidinedione, 3-phenyl-2,4-imidazolidinedione, 3-α-naphthyl-2,4-imidazolidinedione, 1,3-diethyl-2,4-imidazolidinedione, 1-ethyl-3-phenyl-2,4 - imidazolidinedione, ethyl-3-α-naphthyl-2,4-imidazolidinedione, 1,3 - diphenyl - 2,4 - imidazolidinedione, etc.), those of the 2-thio-2,4-imidazolidinedione (i.e., 2-thiohydantoin) series (e.g., 2-thio-2,4-imidazolidinedione, 3-ethyl - 2-thio-2,4-imidazolidinedione, 3-(4-sulfobutyl)-2-thio-2,4 - imidazolidinedione, 3 - (2-carboxyethyl)-2-thio-2,4-imidazolidinedione, 3 - phenyl-2-thio-2,4-imidazolidinedione, 3 - α - naphthyl-2-thio-2,4-imidazolidinedione, 1,3-diethyl - 2 - thio-2,4-imidazolidinedione, 1-ethyl-3-phenyl-2-thio - 2,4-imidazolidinedione, 1-ethyl-3-α-naphthyl-2-thio-2,4-imidazolidinedione, 1,3-diphenyl-2-thio-2,4-imidazolidinedione, etc.), those of the 2-imidazolin-5-one series (e.g., 2-propylmercapto-2-imidazolin-5-one, etc), etc. (especially a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, or a sulfur atom); and $Q_1$ represents a divalent group such as

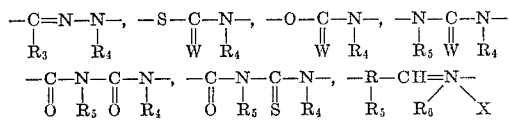

etc., in which $R_3$ represents any of the groups used on the 3-position of 2-pyrazolin-5-ones, e.g., hydrogen alkyl (e.g., methyl, isopropyl, tertiary butyl, hexyl, etc.), aryl (e.g., phenyl, tolyl, etc.), amino (e.g., methylamino, diethylamino, phenylamino, etc.), acylamino (e.g., acetylamino, propionylamino, benzoylamino, etc.), substituted sulfonamido (e.g., butylsulfonamido, phenylsulfonamido, etc.) substituted sulfamyl (e.g., propylsulfamyl, phenylsulfamyl, etc.), substituted carbamyl (e.g., ethylcarbamyl, phenylcarbamyl, etc.); W represents the sulfur, selenium or the oxygen atom; $R_4$ and $R_5$ each represents a member selected from the class consisting of the hydrogen atom, an alkyl group (e.g., methyl, ethyl, butyl, etc.) and an aryl group (e.g., phenyl, tolyl, etc.); $R_6$ represents an alkyl group (e.g., methyl, ethyl, carboxyethyl, sulfoethyl, hydroxyethyl, acetoxyethyl, carbomethoxyethyl, propyl, carboxypropyl, butyl, sulfobutyl, hydroxybutyl, methoxybutyl, hexyl, ethoxyoctyl, sulfodecyl, carboxydecyl, dodecyl, etc.); and X represents an acid anion (e.g., chloride, bromide, iodide, thiocyanate, sulfamate, perchlorate, methyl sulfate, ethyl sulfate, p-toluenesulfonate, etc.

Many of the benzylidene dyes of the type defined by Formulas I and II above have been described in one or more of the following representative patents; J. D. Kendall British Patent 428,222, May 3, 1935, J. D. Kendall British Patent 428,360, May 3, 1935; L. G. S. Brooker U.S. Patent 2,089,729, issued Aug. 10, 1937; G. Schwartz U.S. Patent 2,481,953, issued September 13, 1949; L. G. S. Brooker et al. U.S. Patent 2,748,114, issued May 29, 1956; etc., and in a number of literature references for example, L. G. S. Brooker et al., J. Am. Chem. Soc., 73, pages 5326 and 5332 (1951). For further details of the preparation and uses of the benzylidene dyes coming under Formulas I and II, reference may be had to "The Cyanine Dyes and Related Compounds," by Frances M. Hamer, pages 471–473 and 482–484, Interscience Publishers, 1964.

The sulfonated derivatives useful in practicing my invention comprise polynuclear aromatic compounds containing at least one sulfo group. The term "polynuclear aromatic" as used herein is intended to mean 2 or more benzene rings fused together (for example, as in naphthalene, pyrene, etc.) or at least 2 benzene rings or aromatic rings directly joined together (for example, as in diphenyl, terphenyl, quaterphenyl, etc.) or through an aliphatic linkage. Such sulfonated derivatives can conveniently be represented by the following general formula:

(III)            $R^1\text{---}SO_3M$ wherein $R^1$ represents a polynuclear aromatic group as defined above and M represents a hydrogen atom or a water-soluble cation salt group (e.g., sodium, potassium, ammonium, triethylammonium, triethanolammonium, pyridinium, etc.). These sulfonated derivatives or compounds have been found to have little or no measurable effect by themselves on the sensitivity of photographic silver halide emulsions. Among the most useful of the sulfonated derivatives embraced by Formula III above are the compounds represented by the following general formula:

(IV)
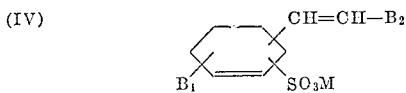

wherein $B_1$ represents a 2-benzotriazolyl group or a 1,3,5-triazin-6-ylamino group, $B_2$ represents an aromatic group (i.e. benzene or substituted benzene) and M is as defined previously.

Typical of the sulfonated derivatives of Formula IV above, wherein $B_1$ represents a 1,3,5-triazin-6-ylamino group (i.e., a 1,3,5-triazin-2-ylamino group) are the compounds selected from those represented by the following general formula:

(IVa)

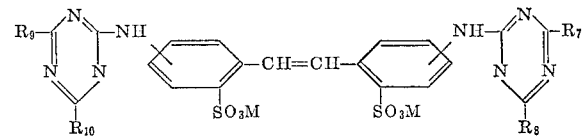

wherein M has the values given above and $R_7$, $R_8$, $R_9$, $R_{10}$ each represents the hydrogen atom or a substituent group, such as hydroxyl, aryloxyl (e.g., phenoxyl, o-tolyloxyl, p-sulfophenoxyl, etc.), alkoxyl (e.g., methoxyl, ethoxyl, etc.), a halogen atom (e.g., chlorine, bromine, etc.), a heterocyclic radical (e.g., morpholinyl, piperidyl, etc.), an alkylthio group (e.g., methylthio, ethylthio, etc.), an arylthio group (e.g., phenylthio, tolythio, etc.), a heterocyclythio group (e.g., benzothiazylthio, etc.), an amino group, an alkylamino (e.g., methylamino, ethylamino, propylamino, dimethylamino, diethylamino, dodecylamino, cyclohexylamino, β-hydroxyethyl lamino, di-β-hydroxyethylamino, β-sulfoethylamino, etc.), an arylamino group (e.g., anilino, o-, m-, and p-sulfoanilino, o-, m-, and p-chloroanilino, o-, m-, and p-anisylamino, o-, m-, and p-toludino, o-, m-, and p-carboxyanilino, hydroxyanilino, sulfonaphthylamino, o-, m-, and p-aminoanilino, p-acetamidoanilino, etc.), etc.

Compounds of Formula IVa wherein $R_7$, $R_8$, $R_9$, and/or $R_{10}$ each represents a heterocyclylamino group (e.g., 2-benzothiazolylamino, 2-pyridylamino, etc.) can also be used in practicing my invention.

Another group of sulfonated derivatives which are useful in practicing my invention are dibenzothiophene dioxides such as those represented by the following general formula:

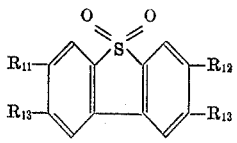

wherein $R_{11}$ is an acylamido group (e.g., acetamido, sulfobenzamido, 4-methoxy-3-sulfobenzamido, 2-ethoxybenzamido, 2,4-diethoxybenzamido, p-toluylamido, 4-methyl-2-methoxybenzamido, 1-naphthoylamido, 2-naphthoylamido, 2,4-dimethoxybenzamido, 2-phenylbenzamido, 2-thienylbenzamido) or a sulfo group, $R_{12}$ represents a sulfoaryl group (e.g., sulfophenyl, p-sulfodiphenyl, etc.) and $R_{13}$ represents a hydrogen atom or a sulfo group, said compound containing at least one sulfo group.

Still other useful sulfonated derivatives of Formula III above include compounds containing diphenyl, terphenyl, quaterphenyl, phenanthrene, pyrene, chrysene, etc. nuclei. Many of the above defined sulfonated compounds are shown in Jones U.S. Patent 2,961,318, issued Nov. 22, 1960.

Included among the benzylidene dyes of Formulas I and II above are the following typical examples.

| Dye No.: | Dye name |
| --- | --- |
| I | 5-p-dimethylaminobenzylidene-3-methylrhodanine. |
| II | 5-p-dimethylaminobenzylidene-3-ethyl-1-phenyl-2-thiohydantoin. |
| III | 5-p-dimethylaminocinnamylidene-3-ethylrhodanine. |
| IV | 5-p-dimethylaminocinnamylidene-3-ethyl-2-thio-2,4-oxazolidinedione. |
| V | 4-p-dimethylaminocinnamylidene-3-hydroxy-1-phenyl-2-pyrazolin-5-one. |
| VI | 5-p-dimethylaminobenzylidene-4-thiohydantoin. |
| VII | 4-(4-p-dimethylaminobenzylidene-3-methyl-1-phenyl-2-pyrazolin-5-ylidene)-3-methyl-1-phenyl-2-pyrazolin-5-one. |
| VIII | 5-p-dimethylaminocinnamylidene-2,4-thiazolidinedione. |
| IX | 5-p-dimethylaminocinnamylidene-1,3-diethylbarbituric acid. |
| X | 5-p-dimethylaminobenzylidene-4-oxo-1,2,3-triphenyl-2-imidazolinium bromide. |
| XI | 4-p-dimethylaminocinnamylidene-1,2-dimethyl-3,5-pyrazolidinedione. |
| XII | 4-(5-p-dimethylaminophenyl-1,3-neopentylene-2,4-pentadienylidene)-3-methyl-1-p-sulphophenyl-2-pyrazolin-5-one, piperidine salt. |
| XIII | 5-[(5-p-dimethylaminophenyl-1,3-neopentylene)-2,4-pentadienylidene]-2-thiobarbituric acid. |
| XIV | 4-p-dimethylaminocinnamylidene-1,2-diethyloxycarbonyl-3,5-pyrazolidinedione. |
| XV | 1,3-diethyl-5-p-diethylaminobenzylidene-2-thiobarbituric acid. |
| XVI | 4-p-dimethylaminobenzylidene-2-thio-2,5-thiazolidinedione. |
| XVII | 2-p-dimethylaminobenzylidenerhodanine. |
| XVIII | 5-(p-dimethylaminobenzylidene)-3-methyl-2-phenyl-4-thiazolidinone-1-dioxide. |

Included among the sulfonated derivatives or compounds of Formula III above are the following typical examples.

| Compound: | Name |
| --- | --- |
| A | Calcofluor White Mr. This is the trade name for a bis(s-triazin-2-ylamino)stilbene-2,2'-disulfonic acid, sodium salt. |
| B | 3,7-bis-(4-methoxy-3-sulfobenzamido)-dibenzothiophene dioxide, sodium salt. |
| C | 4,4''-bis(2,4-dimethoxy-5-sulfobenzamido)-p-terphenyl, triethanolamine salt. |
| D | Leucophor B. This is the trade name for a bis(s-triazin-2-ylamino)stilbene-2,2'-disulfonic acid, sodium salt. |
| E | Sodium 3,7-diacetamido-2,8-disulfodibenzothiophene dioxide. |
| F | Sodium 6-(4-methoxy-3-sulfo-w-phenylacryloyl)-pyrene. |
| G | Sodium 4,4'-bis[2-phenoxy-4-(2-hydroxyethylamino)-1,3,5-triazin-6-ylamino]-stilbene-2,2'-disulfonate. |
| H | 4',4''-disulfo-p-terphenyl, disodium salt. |
| J | Chrysene sodium sulfonate. |
| K | Disodium pyrene-3,X-disulfonate. |
| L | Sodium 4,4'-bis[2-(4-sulfoanilino)-4-(2-hydroxyethylamino)-1,3,5-triazine-6-ylamino]-stilbene-2,2'-disulfonate. |
| M | Sodium phenanthrene-3-sulfonate. |
| N | 4',4''-bis(4-sulfophenoxyacetamido)-p-terphenyl, triethanolamine salt. |

According to my invention, I incorporate one or more of the benzylidene dyes represented by Formulas I and II above with one or more of the sulfonated derivatives represented by Formula III above. My invention is particularly directed to the ordinarily employed gelatino-silver halide emulsions, e.g. gelatino-silver chloride, -chlorobromide, or -bromide, etc. developing-out emulsions. However, the supersensitizing combinations can be employed in silver halide emulsions in which the carrier is other than gelatin, e.g., albumin, agar-agar, etc., or a hydrophilic resinous material such as polyvinyl alcohol, partially hydrolyzed polyvinyl acetate, poly N-vinylpyrolidone, etc., which has no deleterious effect on the light-sensitive silver halide.

The optimum concentration of an individual sensitizing dye can be determined in a manner well known to those skilled in this art by measuring the sensitivity of a series of test portion of the same emulsion, each portion containing a different concentration of the sensitizing dye. The optimum concentration of one supersensitizing combinations can, of course, be readily determined in the same manner, by measuring the sensitivity of a series of test portions of the same emulsion, each portion containing different concentrations of the components in the combination. In determining the optimum concentration for the supersensitizing combination, it is advantageous to employ, at first, concentrations of the benzylidene dye less than its optimum concentration. The concentrations of the dye can then be increased until the optimum concentration of the supersensitizing combination is determined.

The method of incorporating sensitizing dyes in silver halide emulsions are well known to those skilled in the art and these known technique are employed in dispersing the benzylidene dyes, and the sulfonated derivatives, of my invention in the emulsions. These components can be directly dispersed in the emulsions, or they can first be dissolved in some convenient solvent, such as pyridine, methyl alcohol, acetone, water, etc. (or mixtures of such solvents), or diluted with water in some instances, and added to the emulsions in the form of these solutions. If desired, they can be separately dissolved in a given solvent and added separately to the emulsion, or they can be dissolved in the same or different solvent and these solutions mixed togehter before addition is made to the silver halide emulsions. The benzylidene dyes and the sulfonated derivatives, can be dispersed in the finished emulsions and should be uniformly distributed throughout the emulsions before the emulsions are coated on a suitable support, such as paper, glass, cellulose ester film, polyvinyl resin film (e.g., polystyrene film, polyvinyl chloride film, etc.), polyester film, etc. The following procedure has been found quite satisfactory. Stock solutions of the benzylidene dyes, and the sulfonated derivatives, are prepared by separately dissolving these in appropriate solvents as described above. Then, to the flowable silver halide emulsion, the desired amount of stock solution of one of the dyes is slowly added while stirring the emulsion. Stirring is continued until the dye is thoroughly incorporated in the emulsion. Then, the desired amount of stock solution of the sulfonated derivative is slowly added to the emulsion while stirring. Stirring is continued until thoroughly incorporated in the emulsion. The supersensitized emulsions can then be coated on a suitable support and the coating allowed to dry. In some instances, it may be desirable to heat the supersensitized emulsion for a few minutes before coating onto the suitable support. The details of such coating techniques are well known to those skilled in the art. The foregoing procedure and proportions are to be regarded only as illustrative. Clearly, my invention is directed to any silver halide emulsion containing a combination of the aforesaid benzylidene dyes and sulfonated derivatives of Formula III above, whereby a supersensitizing effect is obtained.

The following examples will serve to illustrate further the manner of practicing my invention.

To different portions of the same batch of photographic gelatino-silver-bromoiodide emulsion were added (1) a benzylidine dye, (2) a sulfonated derivative of Formula III above, and (3) a combination of (1) and (2). The emulsions were held for a short time at about 50–52° C., coated on a transparent support, chill set and dried. The coatings were then exposed to a tungsten light source in an Eastman sensitometer (Type 1B) through a Wratten #16 filter which transmits substantially no light of wavelength shorter than about 520 m$\mu$ or a Wratten #4 filter which transmits substantially no light of wavelength shorter than about 450 m$\mu$. The filter was selected to correspond to the sensitizing region of the benzylidine dyes illustrated. The exposed coatings were then processed for three minutes in a developer having the following composition:

| | G. |
|---|---|
| N-methyl-p-aminophenol sulfate | .0 |
| Hydroquinone | 8.0 |
| Sodium sulfite (desiccated) | 90.0 |
| Sodium carbonate (monohydrate) | 52.5 |
| Potassium bromide | 5.0 |
| Water to make 1 liter. | | fixed in a conventional sodium thiosulfate fixing bath, washed and dried. The speed, gamma and fog for each of the coatings was then measured.

The invention is still further illustrated by the following specific examples.

Example 1

A silver bromoiodide emulsion was made of the type described by Trevelli and Smith, Phot. Journal, vol. 79, 330 (1939). The melted emulsion was divided into separate portions to which were added a solution of the sensitizer Dyes I to V and combinations of these with sulfonated compounds A, D, F and G as indicated in Table 1. Each portion was digested at 50° C. for 10 minutes and then coated on a cellulose acetate film support and dried. The dried samples were then given identical exposure, in an Eastman sensitometer (Type 1B) through a Wratten #16 filter, for 1 second to a tungsten light source, processed for 3 minutes in the aforementioned developer, fixed, washed and dried. Densitometric measurements were made of the developed images on each coating. The relative speed values were calculated based on an arbitrary relative speed of 120 for the coating sensitized with .08 g. of Dye I per mole of silver halide and the gamma values determined. These values together with the fog values are given in Table 1.

TABLE 1

| Dye and Concentration, g./mol. Silver Halide | Relative Speed | Gamma | Fog |
|---|---|---|---|
| I (.08) | 120 | 1.37 | .03 |
| I (.08) plus A (1.15) | 398 | 0.96 | .03 |
| II (.08) | 132 | 1.18 | .04 |
| II (.08) plus A (1.15) | 363 | 1.00 | .04 |
| III (.04) | 35.5 | 1.56 | .03 |
| III (.04) plus A (1.15) | 276 | 1.09 | .03 |
| IV (.04) | 110 | 1.94 | .05 |
| IV (.04) plus A (1.15) | 417 | 1.24 | .03 |
| IV (.04) | 76 | 2.30 | .05 |
| IV (.04) plus D (2.2) | 276 | 2.24 | .05 |
| IV (.04) plus C (.56) | 316 | 2.18 | .06 |
| IV (.04) plus G (.56) | 115 | 2.24 | .06 |
| IV (.08) | (¹) | | .04 |
| V (.08) plus A (1.1) | 20 | 1.44 | .04 |

¹ Slight image.

Referring to the above table, it will be noted that in each case of comparison the relative speed of the sensitizing combination was substantially higher than that of the individual dye. For example, the relative speed of the combination of Dye III with sulfonated compound A was more than 7 times greater than the relative speed of Dye III by itself.

Example 2

Coatings were made as in Example 1, excepting that Dyes VI, VII and VIII and combinations of these with sulfonated compound A, were employed. These coatings were exposed as in Example 1 and the values of the relative speeds (based on a relative speed of 132 for Dye VI), gamma and fog values were determined. The results obtained are listed in the following Table 2.

TABLE 2

| Dye and Concentration, g./mol. Silver Halide | Relative Speed | Gamma | Fog |
|---|---|---|---|
| VI (.08) | 132 | 1.61 | .04 |
| VI (.08) plus A (1.0) | 436 | 1.39 | .04 |
| VII (.08) | 6.2 | 1.10 | .04 |
| VII (.08) plus A (1.0) | 27.5 | 1.23 | .04 |
| VIII (.08) | 13.8 | 1.30 | .04 |
| VIII (.08) plus A (1.0) | 251 | 1.29 | .04 |

It will be noted from Table 2 above that in each case of comparison, the relative speed of the combination of the specified dye and the sulfonated compound was substantially higher, and in one case by a factor of about 18 times that of the individual dye by itself (Dye VIII alone and in combination with sulfonated compound A).

Example 3

Coatings were made as in Example 1, excepting that Dyes IX to XVIII and combinations of these with sulfonated compounds A, B, D, E, F, G, H, J, K, L, M and N, as indicated in following Table 3, were employed. These coatings were exposed as in Example 1, using a Wratten #16 filter in all cases, except with Dye XVIII where a Wratten #4 filter was used, and the values for relative speeds (based on relative speeds of 0.63 for Dye IX and 100 for Dye XVIII), gammas and fog values were determined. The results obtained are listed in the following Table 3.

TABLE 3

| Dye and Concentration, g./mol. Silver Halide | | Relative Speed | Gamma | Fog |
|---|---|---|---|---|
| IX | (.08) | 0.63 | 1.02 | .06 |
| IX | (.08) plus A (1.1) | 100.0 | 1.73 | .04 |
| X | (.08) | 6.7 | 1.48 | .04 |
| X | (.08) plus A (1.1) | 26.5 | 1.25 | .04 |
| XI | (.08) | <0.5 | | .06 |
| XI | (.08) plus A (1.1) | 25.0 | 1.69 | .05 |
| XII | (.08) | 4.8 | 1.66 | .06 |
| XII | (.08) plus A (1.1) | 11.8 | 1.63 | .04 |
| XIII | (.08) | 1.0 | 1.56 | .04 |
| XIII | (.08) plus A (1.1) | 4.2 | 1.68 | .04 |
| XIV | (.08) | <0.5 | | .06 |
| XIV | (.08) plus A (1.1) | 32.0 | 1.71 | .04 |
| XV | (.08) | 40.0 | 3.68 | .06 |
| XV | (.08) plus A (1.1) | 100.0 | 3.00 | .04 |
| XVI | (.08) | 18.0 | 3.40 | .06 |
| XVI | (.08) plus A (1.1) | 110.0 | 3.04 | .04 |
| XVII | (.08) | <0.8 | | .06 |
| XVII | (.08) plus B (1.1) | 100.0 | 1.95 | .04 |
| XVII | (.08) plus E (1.1) | 57.0 | 2.10 | .04 |
| XVII | (.08) plus J (1.1) | 76.0 | 2.12 | .04 |
| XVII | (.08) plus K (1.1) | 58.0 | 2.02 | .04 |
| XVII | (.08) plus L (1.1) | 83.0 | 2.16 | .04 |
| XVII | (.08) plus H (2.2) | 73.0 | 2.18 | .04 |
| XVII | (.08) plus M (2.2) | 69.0 | 2.16 | .04 |
| XVII | (.08) plus D (2.2) | 95.0 | 2.28 | .04 |
| XVII | (.08) plus N (.56) | 94.0 | 2.34 | .05 |
| XVII | (.08) plus F (.56) | 80.0 | 2.66 | .04 |
| XVII | (.08) plus G (.56) | 83.0 | 2.14 | .04 |
| IX | (.08) | <17 | | .06 |
| IX | (.08) plus B (1.1) | 100.0 | 1.60 | .04 |
| IX | (.08) plus J (1.1) | 54.0 | 1.12 | .04 |
| IX | (.08) plus K (1.1) | 22.5 | 0.88 | .04 |
| IX | (.08) plus D (2.2) | 132.0 | 1.76 | .04 |
| IX | (.08) plus F (.56) | 80.0 | 1.12 | .04 |
| XVIII | (.08) | 100.0 | 3.30 | .06 |
| XVIII | (.08) plus A (1.1) | 295.0 | 3.10 | .04 |

By reference to above Table 3, it will be noted that in every case of comparison, the relative speed of the combination of dye and sulfonated compound was substantially greater than that of the individual dye. Thus, the relative speed of combination of Dye IX with sulfonated compound A was more than 150 times greater than the relative speed of Dye IX by itself.

The accompanying drawing illustrates the supersensitizing effect obtained with one of my new combinations in gelatino-silver-bromoiodide emulsion. The figure of the drawing is a diagrammatic reproduction of two spectrograms. In the figure, the sensitivity of the emulsion containing the benzylidene dye is represented by the solid lower curve. The dotted line curve represents the sensitivity conferred on the emulsion by the combination of the benzylidene dye with one of the sulfonated compounds of my invention. No curve illustrating the effect of the sulfonate compound alone is shown, inasmuch as it has been found that the sulfonated compounds used in the invention have little or no measurable effect on the sensitivity of the emulsions.

In FIGURE 1, curve A represents the sensitivity of an ordinary gelatino-silver-bromoiodide emulsion sensitized with 5-p-dimethylaminocinnamylidene-3 - ethylrhodanine (Dye III), while curve B represents the sensitivity of the same emulsion sensitized with a combination of above Dye III and Calcofluor White MR (a bis (s-triazin-2-ylamino) stilbene-2,2'-disulfonic acid, sodium salt). The sensitometric measurements for these emulsions are given in above Table 1.

The term "sulfo" is used in the foregoing and in the following claims to mean both the free acid group, as well as salts of this free acid group, including alkali metal salts (e.g., sodium, potassium, etc.), ammonium salts, amine addition salts (e.g. triethylamine, ethanolamine, triethanolamine, pyridine, picoline, etc.). By thus using these water-soluble salt derivatives, they can be added to the emulsions in substantially neutral aqueous solutions without disturbing the pH of the emulsions. However, when using small quantities of the sulfonated derivatives, the free acids can also be used to advantage.

This invention has been described in detail with particular reference to preferred embodiments thereof, but it will be understood that variations and modifications can be effected within the spirit and the scope of the invention as described herein above and as defined in the appended claims.

I claim:
1. A photographic silver halide emulsion containing (1) at least one benzylidene dye represented by the formulas:

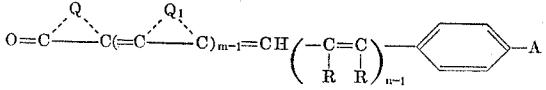

and

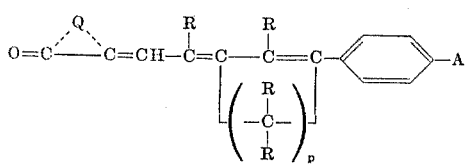

wherein $m$ represents an interger of from 1 to 2; $n$ represents an integer of from 1 to 3; $p$ represents an integer of from 2 to 3; each R represents a member selected from the class consisting of the hydrogen atom and a lower alkyl group; A represents a member selected from the class consisting of a hydroxyl radical, an alkoxy group and the group —$NR_1R_2$; $R_1$ and $R_2$ each represents a member selected from the class consisting of the hydrogen atom and an alkyl group; Q represents the non-metallic atoms required to complete a 5- to 6-membered heterocyclic nucleus; $Q_1$ represents a divalent group selected from the class consisting of a

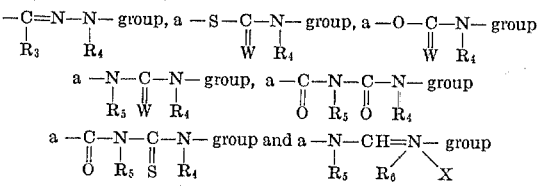

$R_3$ represents a member selected from the class consisting of the hydrogen atom, an alkyl group, an amino group, an acylamino group, a sulfamido group, a sulfamyl group and a carbamyl group; W represents an atom selected from the class consisting of oxygen, selenium and sulfur; $R_4$ and $R_5$ each represents a member selected from the class consisting of the hydrogen atom, an alkyl group and an aryl group; $R_6$ represents an alkyl group; X represents an acid anion; and (2) at least one sulfonic acid derivative of a compound selected from the class consisting of a bis(triazinylamino) stilbene, a dibenzothiophene dioxide, a biphenyl, a terphenyl, a quaterphenyl, a phenanthrene, a pyrene, and a chrysene.

2. A photographic silver halide emulsion containing (1) at least one benzylidene dye represented by the following formulas:

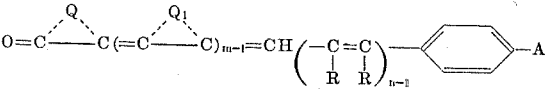

and

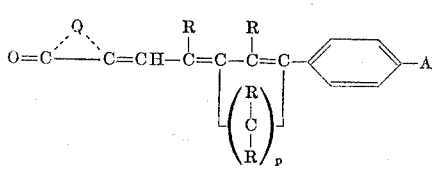

wherein $m$ represents an integer of from 1 to 2; $n$ represents an integer of from 1 to 3; $p$ represents an integer of from 2 to 3; each R represents a member selected from the class consisting of the hydrogen atom and a lower alkyl group; A represents a member selected from the class consisting of a hydroxyl radical, an alkoxy group and the group —$NR_1R_2$; $R_1$ and $R_2$ each represents a member selected from the class consisting of the hydrogen atom and an alkyl group; Q represents the non-metallic atoms required to complete a heterocyclic nucleus selected from the class consisting of a 2-pyrazolin-5-one nucleus, an isoxazolone nucleus, an oxindole nucleus, a barbituric acid nucleus, a 2-thio-barbituric acid nucleus, a rhodanine nucleus, a 2(3H)-imidazo[1,2-a]pyridone nucleus, a 5,7-dioxo-6,7-dihydro-5-thiazolo[3,2-a]pyrimidine nucleus, a 2-thio-2,4-oxazolidinedione nucleus, a thianaphthenone nucleus, a 2-thio-2,5-thiazolidinedione nucleus, a 2,4-thiazolidinedione nucleus, a thiazolidinone nucleus, a 2-thiazolin-4-one nucleus, a 2-imino-2,4-oxazolidinone nucleus, a 2,4-imidazolidinedione nucleus, a 2-thio-2,4-imidazolidinedione nucleus and a 2-imidazolin-5-one nucleus; $Q_1$ represents a divalent group selected from the class consisting of a

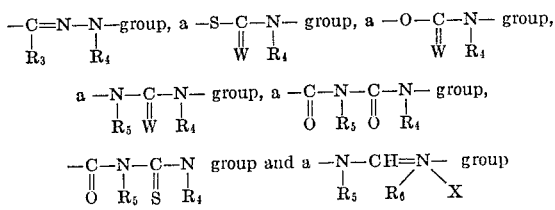

$R_3$ represents a member selected from the class consisting of the hydrogen atom, an alkyl group, an amino group, an acylamino group, a sulfamido group, a sulfamyl group and a carbamyl group; W represents an atom selected from the class consisting of oxygen, selenium and sulfur; $R_4$ and $R_5$ each represents a member selected from the class consisting of the hydrogen atom, an alkyl group and an aryl group; $R_6$ represents an alkyl group; and X represents an acid anion; and (2) at least one sulfonic acid derivative of a compound selected from the class consisting of a bis(triazinylamino)stilbene, a dibenzothiophene dioxide, a biphenyl, a terphenyl, a quaterphenyl, a phenanthrene, a pyrene and a chrysene.

3. A photographic silver halide emulsion of claim 2 wherein said (2) is a sulfonic acid derivative of a bis(triazinylamino)stilbene.

4. A photographic silver halide emulsion of claim 2 wherein said (2) is a sulfonic acid derivative of a dibenzothiophene dioxide.

5. A photographic silver halide emulsion of claim 2 wherein said (2) is a sulfonic acid derivative of a terphenyl.

6. A photographic silver halide emulsion of claim 2 wherein said (2) is a sulfonic acid derivative of a pyrene.

7. A photographic silver halide emulsion of claim 2 wherein said (2) is a sulfonic acid derivative of a chrysene.

8. A photographic silver halide emulsion containing a supersensitizing combination of 5-p-dimethylaminocinnamylidene-3-ethylrhodanine with Calcofluor White MR.

9. A photographic silver halide emulsion containing a supersensitizing combination of 2-p-dimethylaminobenzalrhodanine with 3,7 - bis(4 - methoxy-3-sulfobenzamido)-dibenzothiophene dioxide, sodium salt.

10. A photographic silver halide emulsion containing a supersensitizing combination of 2-p-dimethylaminobenzalrhodanine with 4′,4″-bis(4-sulfophenoxyacetamido)-p-terphenyl, triethanolamine salt.

11. A photographic silver halide emulsion containing a supersensitizing combination of 5-p-dimethylaminocinnamylidene-1,3-diethylbarbituric acid with sodium 6-(4-methoxy-3-sulfo-w-phenylacryloyl)-pyrene.

12. A photographic silver halide emulsion containing a supersensitizing combination of 5-p-dimethylaminocinnamylidene-1,3-diethylbarbituric acid with chrysene sodium sulfonate.

13. A photographic element comprising a support coated with at least one layer containing a photographic silver halide emulsion of claim 1.

14. A photographic element comprising a support coated with at least one layer containing a photographic silver halide emulsion of claim 2.

References Cited
UNITED STATES PATENTS

| | | | |
|---|---|---|---|
| 2,875,058 | 2/1959 | Carroll et al. | 96—104 |
| 2,933,390 | 4/1960 | McFall et al. | 96—104 |
| 2,947,630 | 8/1960 | Jones | 96—104 |
| 2,950,196 | 8/1960 | Carroll et al. | 96—104 |
| 2,961,318 | 11/1960 | Jones | 96—104 |

J. TRAVIS BROWN, *Primary Examiner.*